(12) United States Patent
Poss

(10) Patent No.: US 7,235,764 B2
(45) Date of Patent: Jun. 26, 2007

(54) ROASTING COFFEE BEANS

(75) Inventor: Glen T. Poss, Nine Mile Falls, WA (US)

(73) Assignee: Coffee Technologies International Inc., San Carlos, CA (US)

( * ) Notice: Subject to any disclaimer, the term of this patent is extended or adjusted under 35 U.S.C. 154(b) by 0 days.

(21) Appl. No.: 11/029,168

(22) Filed: Jan. 3, 2005

(65) Prior Publication Data

US 2005/0238767 A1 Oct. 27, 2005

Related U.S. Application Data

(63) Continuation of application No. 10/065,419, filed on Oct. 16, 2002, now abandoned.

(51) Int. Cl.
H05B 6/80 (2006.01)

(52) U.S. Cl. .................. 219/730; 219/689; 220/912

(58) Field of Classification Search .............. 219/730, 219/725, 751, 754, 732, 762, 689, 734; 229/125.015; 215/204; 426/35, 466, 109, 234, 241; 220/258.3, 220/912
See application file for complete search history.

(56) References Cited

U.S. PATENT DOCUMENTS

| | | | |
|---|---|---|---|
| 4,158,760 A | 6/1979 | Bowen et al. | |
| 4,416,906 A | 11/1983 | Watkins | |
| 4,699,290 A | 10/1987 | Adams | |
| 4,713,510 A | 12/1987 | Quick et al. | |
| 4,714,813 A | 12/1987 | Trenchard | |
| 4,786,773 A * | 11/1988 | Keefer | 219/734 |
| 5,189,272 A | 2/1993 | McDonald et al. | |
| 5,244,682 A | 9/1993 | Happ | |
| 5,317,120 A | 5/1994 | Bunke et al. | |
| 5,352,465 A | 10/1994 | Gondek et al. | |
| 5,357,086 A | 10/1994 | Turpin et al. | |
| 5,681,607 A | 10/1997 | Maki et al. | |
| 5,770,840 A | 6/1998 | Lorence | |
| 5,780,824 A | 7/1998 | Matos | |
| 5,890,418 A | 4/1999 | Song | |
| 5,919,390 A | 7/1999 | Childress | |
| 5,996,480 A | 12/1999 | Kelley et al. | |
| 6,436,457 B1 | 8/2002 | Poss | |
| 6,586,715 B2 | 7/2003 | Watkins | |
| 2003/0010787 A1 * | 1/2003 | Dalton et al. | 220/912 |

FOREIGN PATENT DOCUMENTS

JP 02171144 A 12/1988

* cited by examiner

*Primary Examiner*—Quang Van
(74) *Attorney, Agent, or Firm*—Christensen O'Connor Johnson Kindness PLLC

(57) ABSTRACT

A device and process to roast green coffee beans using a combination of microwave, conduction, convection, infrared, and latent steam heating. The device is a sealed cartridge that is semi porous and is used in a conventional or purpose built microwave oven. The resultant coffee is more flavorful and uses ½ the energy that conventional roasters use.

5 Claims, 3 Drawing Sheets

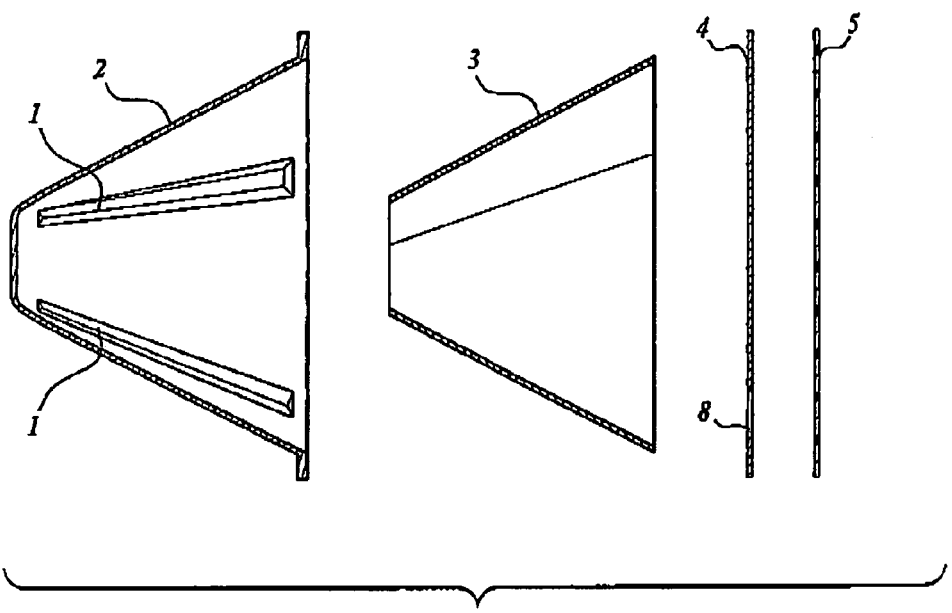
Fig.1.
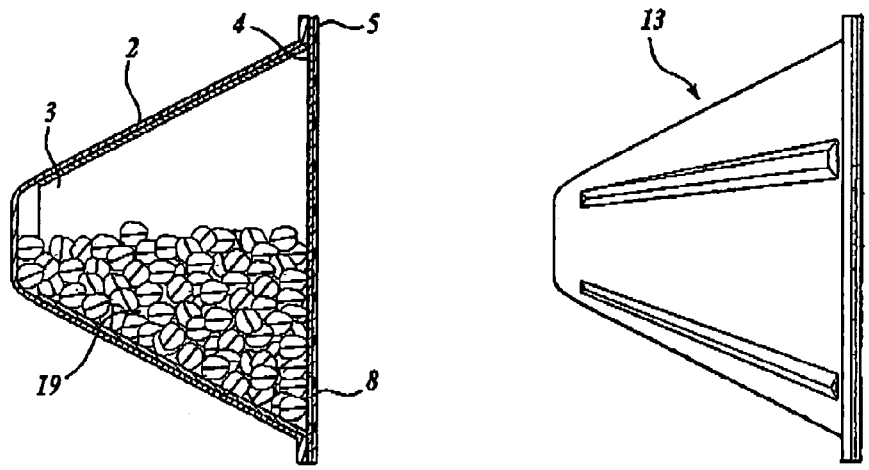 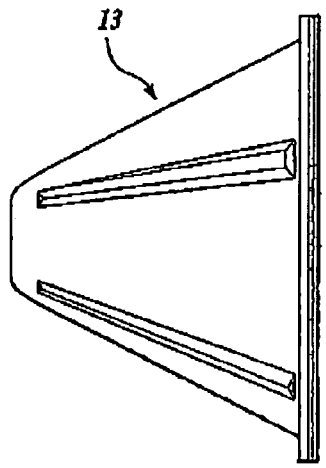
Fig.2. Fig.3.

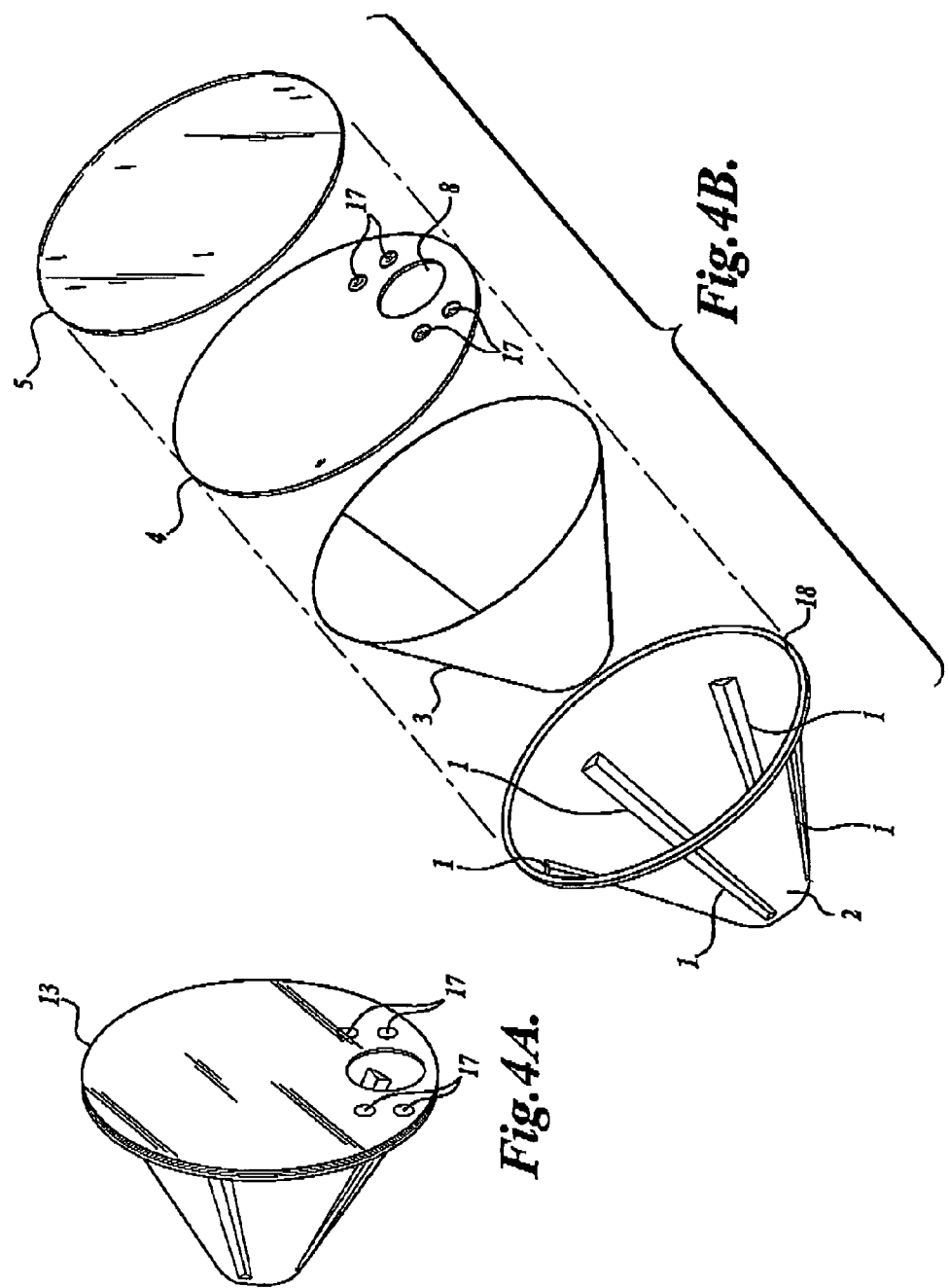

ROASTING COFFEE BEANS

CROSS-REFERENCE TO RELATED APPLICATIONS

This application is a continuation of U.S. patent application Ser. No. 10/065,419, filed Oct. 16, 2002 now abandoned, which claims the benefit under 35 U.S.C. Section 120, and is incorporated herein by reference.

BACKGROUND OF THE INVENTION

Recent years have seen an explosion of interest in gourmet coffee products and the interest has not been limited to the purchase of coffee-based beverages from vendors who prepare the beverage on premise and purvey it to consumers over the counter. The desire is now for the ultimate in freshness and flavor and that is roasting the coffee on site at the coffee shop and or at home. Coffee roasting is a two-step process. The outside of a bean is covered with a husk which also follows a fold into the center of the bean. As it is roasted, the coffee bean expands and literally "pops" to shed the outer husk. If the bean is properly roasted, the center of the bean further expands and allows some of the internal husk to break free of the bean.

Currently coffee beans are roasted via two common methods and a third one that is less common. The common methods are convection and conduction. Convection uses a heated air steam to heat the bean and "float" it in an air stream to reduce burning; however, this heated air system also strips away through evaporation a large amount of the coffee oils that are vital components in the flavor of superior coffee. Conduction is the other roasting method and in this system only heat from the externally heated open metal drum is used to roast the bean through direct contact The conduction method rotates the drum for agitation to prevent scorching the coffee bean. The conduction system still uses air that is circulated in the drum to remove heat and smoke and results in loss of lighter coffee oils (and their flavor) just as in the convection system. The conduction system also prevents the controlled and easy transfer of the heat to penetrate the husk and cause the internal mass of the bean to quickly rise to a desired temperature. This causes moisture and oil within the bean to vaporize and expand, thereby applying pressure to the husk and resulting in the popping of the bean. The mass of the bean expands and the husk is freed from the bean. The other method of roasting beans is the use of steam as shown in U.S. Pat. No. 5,681,607, issued on Oct. 28, 1997 to Maki, et al. Roasting with superheated steam, however, tends to make the coffee much more sour. The steam process use a high-pressure vessel and high steam temperatures and pressures making this system potentially very dangerous for the home and commercial user. The steam system alone cannot provide the dark and very dark roasts that are desired by most of the coffee drinking public. Various embodiments of the invention use "latent" steam in combination with convection, conduction, infrared, and microwave heating to provide a full spectrum of roasting levels. Latent steam is a result of the water that is contained in the coffee beans (generally 10%-12% by weight) and is boiled out of the bean during the initial convection/conduction/microwave heating that is part of the roasting process. This latent steam is a contributor to making the coffee more "mellow," as in the steam-only process; but because it is part of the bean, it requires no separate boiler and due to the design of the cartridge is of low pressure and thereby is not a hazard.

Other problems with conductive, convection and steam roasting include a situation where a bean is roasted at too low of a temperature, the moisture build-up is sufficiently slowed as to allow the vapor to escape without building up sufficient pressure to pop the bean. When this occurs, the bean will be of smaller size than if proper roasting occurs and has a green grassy flavor. On the other hand, if a bean is roasted at too high of a temperature, the bean will be burned, i.e., overly caramelized, and taste will suffer. In some cases, high temperature roasting will result in a burning of the husk. As the husk serves as a moisture barrier to allow pressure to build up during roasting, the burning of the husk destroys the moisture barrier and allows the moisture to escape without building up sufficient pressure to pop the bean. The second stage of roasting occurs once the bean pops. Here, the heating of the oil within the bean results in chemical changes to roast the bean to the taste of a particular consumer. In many instances, continued roasting of the bean after popping causes a further expansion of the bean. To achieve optimum roasting, it is necessary that the beans be uniformly heated internally via microwaves and externally via conduction, convection and latent steam while not allowing any of the oils and essences that are components of the flavor to escape into the air prior to grinding. If the heating is not uniform, some of the beans may pop early in the roasting process and others, not at all. Consequently, uniform flavor cannot be obtained. Similarly, it is necessary that roasting temperature be properly controlled to assure proper flavor development which cannot occur if the roasting temperature is either too low or too high.

Other common problems with current coffee roasters is the issue of smoke and excessive aroma. The smoke and excessive aroma is dealt with on existing commercial roasters by the use of stack scrubbers and after burners, the problem is dealt with on home coffee roasters by there recommend use out doors. Other problems that the current roasters have is high energy cost per pound of beans either using gas or electricity. This is on the order of 50% higher than microwave driven roasting. The present invention is directed to overcoming one or more of the above problems.

SUMMARY OF THE INVENTION

The principal object of the invention is to provide a new and improved coffee bean roasting apparatus and process suited for home or commercial use. According to one facet of the invention, an exemplary embodiment of an apparatus for roasting coffee beans includes a closed cartridge that is constructed of non-porous or semi porous material. One of the preferred embodiments of the cartridge is to be made by pulp forming. The cartridge contains a controlled portion of coffee and the coffee beans occupy 29% of the internal volume of the cartridge to allow for expansion during the roasting process. The cartridge may also be used for long term storage and handling of the coffee. The cartridge is further completely lined with a floating liner that is comprised of a printed dipole antenna or a thin film conductor that selectively absorbs microwave radiation (susceptor). This susceptor is made generally of a printed dipole antenna on a polyester film that is laminated to a zero acid neutral pH paper. The susceptor only partly converts the microwaves to heat and allows the unabsorbed microwave energy to be absorbed by the coffee beans to effect internal heating. The cartridge may be of cylindrical, spherical or conical shape. If the cartridge is of cylindrical or conical shape one end will be closed with an airtight closure that may be of card stock paper or pulp formed material. The closure may contain a see through window of polyester or other suitable transparent or translucent film so that the degree of roast can be visually assessed. The cartridge is placed in a microwave environment, which may be either a commercial/residential microwave oven or a purpose designed microwave chamber. The cartridge is then caused to roll either by interaction with, in the case of an existing domestic/commercial microwave oven, the turntable and a fixed feature imparting the motion of the turn table on to the cartridge. Alternately a separate microwave safe device can be provided to cause the cartridge to rotate at the desired speed and for the desired duration. The preferred embodiment of the cartridge is that it is generally conical in shape with a blunted point. The details of the roasting process is as follows. In operation the cartridge is placed in the microwave cavity of either a home, commercial or purpose built microwave oven turn in a orientation that allows the cartridge to roll when it interacts with the fixed bar imparting the turntables rotation to the cartridge. The fixed bar is an addition to an existing microwave oven or may be replaced with a dedicated device to allow the cartridge to roll. The cartridge rotating causes the coffee beans to tumble as they move up the "high" side of the cartridge and when they exceed the maximum angle of repose cascade down allowing for all the beans to be in direct contact with the susceptor. This constant tumbling agitation allows all the beans to be heated in all 4 forms evenly. The microwave power is projected into the cavity and is omni-directional with the microwave energy coming from all directions this allows for the multiple heating methods to take place. The beans that are in direct contact with the susceptor are directly heated by conduction and the choice of the susceptor allows for precise temperature generation when energized with microwave energy preventing scorching. The susceptor laminate is formed into a hollow conical/cylindrical/spherical shape and the area that is not in contact with the coffee beans are still converting microwave energy but into infrared heat. The infrared heat indirectly heats the beans by convection heating the steam that the beans emit as they start to roast. The infrared also directly heats the beans at a lower temperature that the conduction heating of direct contact. The microwave energy that is not converted by the susceptor is absorbed by the oils, water and proteins inside of the coffee beans assisting in the generation of an even roast through out as well as using the consumed power efficiently. The coffee beans as they heat first degas or boil off their water content and the water vapor tries to escape to the outside. As the water vapor attempts to transpire to the outside it encounters the pulp formed cartridge, causing the pulp to swell and form a highly restrictive filter that traps a high percentage of the latent steam. The cartridge also traps the aroma and flavors that would normally be washed away by the airflow in other roasters. The roasting process is complete when the operator determines the coffee is roasted enough by visual means through the filling port, or by auditory by the second crack of the coffee beans while they roast. In its preferred embodiment the recommended roasting time and power level will be printed on the cartridge as well as other information as to origin of the coffee bean and expected tastes at degrees of roast featured by the roasting gauge. In the preferred embodiment four specific color dots labeled L, M, MD, and D are printed by the filler port and are keyed to the written description of the flavor expectation for that degree of roast. In the preferred embodiment the cartridge will be made of pulp formed paper and form a semi conical shape with reinforcing ridges that also provide an area for vapor transpiration around the non-attached susceptor liner. The preferred embodiment also uses a end closure of cardboard or pulp formed material that contains a hole that is covered by a transparent or semi-transparent material to load the cartridge with coffee beans. The preferred embodiment includes a fixture to translate the motion of the existing turntable into rotation of the cartridge; alternately a separate device may be used to rotate the cartridge in the microwave environment. The separate device may be either spring, battery or powered by the microwave energy of the microwave oven. Other objects and advantages will be apparent from the following specification taken in connection with the accompanying drawings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1. Comprises a cross section view of the cartridge assembly that includes (13) the substantially conical cartridge with recess (2) in the side placed co-axel to and evenly around the circumference to provide a pathway around the susceptor liner for latent steam to transfer to the outside and as a reinforcement for the pulp formed canister. Area (3). Is a cross section view of the die cut flat but formed susceptor linen. Item (4) is a cross section view of the die cut card stock closure with filler port (8) die cut into item (4) and roasting color guides (17) placed by opening. Item (5) is a cross section view of the polyester film that is laminated to the closure 4 using starch based adhesive suitable for contact with food.

FIG. 2. Is a cross sectional view of the completed cartridge loaded with coffee beans (19) and showing the closure glued don with a starch based glue suitable for contact with food on surface (18).

FIG. 3 is an external side view of the completed cartridge (13).

FIG. 4A is an external perspective view of the complete cartridge (13) and FIG. 4B is an exploded view of component parts 2, 3, 4, and 5.

DETAILED DESCRIPTION OF THE PREFERRED EMBODIMENT

Figure 5:
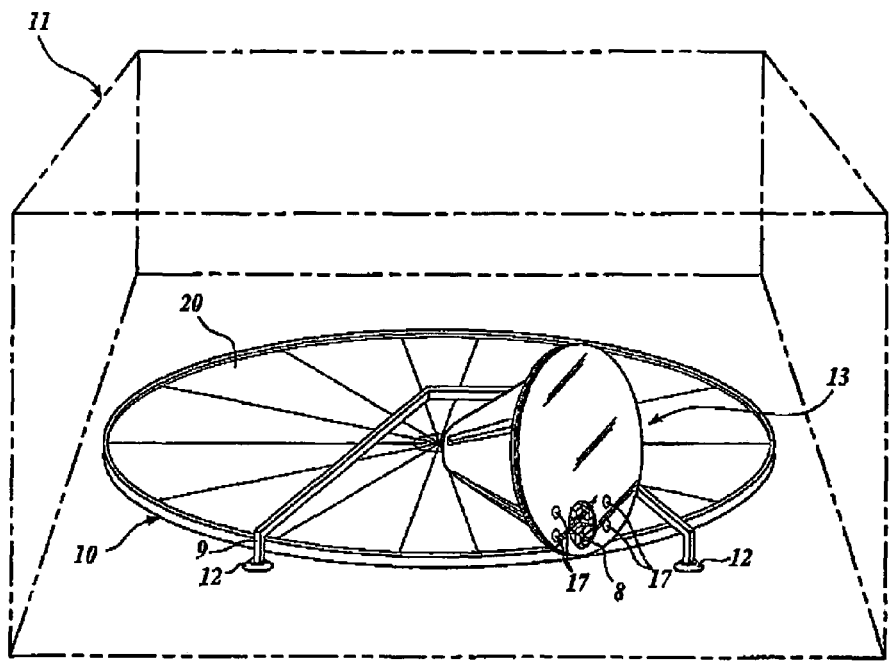
FIG. 5 is a view of the completed pod in a schematic view of a microwave oven.
Figure 6:
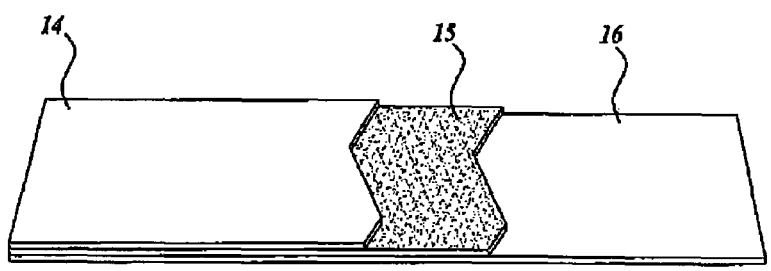
FIG. 6 is a cut away view of the susceptor laminate showing construction.

Hereinafter, this invention will be described in detail with reference to the drawings. As illustrated in FIGS. 1-6 the present invention comprises a cartridge 13 that is made of a semi-porous material that in the preferred embodiment will be pulp formed paper. The cartridge may be conical, cylindrical, or spherical in shape and will contain recesses 1 for the purpose of supplying an air gap for the susceptor laminate 3. The susceptor laminate 3 is formed from flat sheet and is die cut into a semi circle to allow the placement of the laminate into the body of the cartridge 13 and is not affixed in any manner. The susceptor laminate 3 is composed of 3 layers as shown in FIG. 6 the outer layers 14 and 16 are preferably Kraft paper or any zero acid neutral pH paper and is laminated to the susceptor film 15 using adhesive that is approved for food contact. The susceptor film 15 is comprised of a printed dipole antenna or a thin film conductor on a polyester substrate. The closure lid 4 in the preferred embodiment is composed of card stock made of recycled paper and is rated for food contact. The closure lid 4 has a hole 8 cut into it for the use of filling and emptying the canister. The hole 8 can be placed in any location on the closure lid 4 and will be of sufficient size to allow for the purpose of filling and emptying the canister. The color dots 17 are in close proximity to the hole 8 and are provided for a color reference of the roasted coffee. The color dots 17 are each of a different color but generally reflect the colors of roasted coffee from light to dark roast. The color dots 17 have reversed out of the color field the letters L, M, MD and D. The color dots 17 and associated letters are used for reference to the flavor and aroma of the coffee when roasted to that level. The closure lid 4 also has provisions for printing that can include but are not limited to the operation instructions, type of coffee bean or blend, origin of the coffee bean, tasters comments on flavor and suggested degree of roasting. The clear or translucent non-porous layer 5 is laminated to the closure 4 after the closure is printed and the hole 8 has been die cut. The clear or translucent layer 5 is in the preferred embodiment 0.01 mm thick polyester but can be of other thickness and is preferably clear but can be translucent. The cartridge 13 is assembled by rolling the susceptor 3 into a shape that will fit into the cartridge and rests on the recesses 1. The coffee beans are then loaded into the canister. The green coffee beans 19 can be of any amount and from any locations and can be of either of two primary types arabica and or robusta or any combination of either. The volume of green coffee beans will not exceed ½ the volume of the completed canister. The closure lid 4 completed with its laminated clear or translucent layer is then glued on to the canister via a the flange 18. The glue will be of food contact rated material and may be applied by roller, spray or bead. The cartridge is used in any microwave oven, commercial, consumer or purpose built but in the preferred embodiment it is for use in commercial and consumer microwave ovens. The completed canister 13 as shown FIGS. 3 and 4 is used by placing the canister 13 into a microwave cavity 11 as shown in FIG. 5 and on the turn table 10 or alternately on a specific device that is a separate device may be used to rotate the cartridge in the microwave environment. The separate device may be either spring, battery or powered by the microwave energy of the microwave oven. The canister 13 is oriented so that the circular cross section is perpendicular to the turn table 10 or the separate device so as to allow the cartridge 13 to roll. The turn table 10 is in the preferred embodiment covered with a microwave proof silicon rubber pad 20 that is to enhance friction between the cartridge 13 and the turntable 10. The pad 20 in the preferred embodiment will have a shallow conical cross section to allow for the green coffee beans 19 in the cartridge 13 to flow to the closure end 4. The microwave cavity also has a fixture 9 that is attached to the floor of the microwave cavity 11 by feature 12. The feature 12 can be of any permanent or temporary attachment so as to prevent the fixture 9 from moving when in contact with cartridge 13. The function of the fixture 9 is to prevent the cartridge 13 from rotating around on the turntable 11 and pad 20 and there by imparts the rotation of the turntable 11 and pad 20 onto the cartridge 13. This rotation is a component of the roasting process. After placement of the cartridge 13 the microwave oven may be energized as per the time and power level as per the instructions for the product. When the coffee 19 is roasted to the desired level the cartridge 13 is then removed from the microwave cavity 11 and is opened by either removal of the layer 5 or by removing the material covering the hole 8 and then pouring out the roasted beans for grinding. As will be appreciated from the above description, the present invention provides a convenient and easy to use device and process for the roasting of green coffee beans as ingredient that is suitable for use in microwave ovens. While a particular form of the invention has been illustrated and described, it will be apparent that various modifications can be made without departing from the spirit and the scope of the invention. Accordingly, it is not intended that the invention be limited except as by the appended claims.

While the preferred embodiment of the invention has been illustrated and described, it will be appreciated that various changes can be made therein without departing from the spirit and scope of the invention.

The invention claimed is:

1. A container for roasting coffee beans in a microwave oven, comprising:
   a first layer shaped into a first chamber bounded at one end by a first circular plane base and at the other end by a second circular plane base, the second circular plane base having a circular area that is less than a circular area of the first circular plane base thus forming a substantially conical shape;
   a second layer composed from a susceptor laminate material and shaped into a second chamber, the second chamber being housed by the first layer;
   a closure lid positioned over the first circular plane base to close the first chamber and the second chamber to contain coffee beans, the closure lid including a filler port; and
   a film placed over the closer lid to cover the filler port while allowing the doneness of the coffee beans to be visibly observed while the coffee beans are being roasted.

2. The container of claim 1, wherein the first layer includes a set of recesses that are spaced apart and positioned longitudinally from the first circular plane base toward the second circular plane base.

3. The container of claim 1, wherein the first layer is formed from a pulp material.

4. The container of claim 1, wherein the susceptor laminate is formed from a susceptor film that converts microwave energy into infrared heat.

5. The container of claim 1, wherein the closer lid includes roasting color guides to aid in to determination of doneness of the coffee beans.

* * * * *

UNITED STATES PATENT AND TRADEMARK OFFICE
CERTIFICATE OF CORRECTION

PATENT NO. : 7,235,764 B2  Page 1 of 1
APPLICATION NO. : 11/029168
DATED : June 26, 2007
INVENTOR(S) : G.T. Poss It is certified that error appears in the above-identified patent and that said Letters Patent is hereby corrected as shown below:

| COLUMN | LINE | |
|---|---|---|
| 1 | 29 | "steam" should read --stream-- |
| 1 | 35 | "contact The" should read --contact. The-- |
| 2 | 65 | "shape one" should read --shape, one-- |
| 4 | 28 | "linen." should read --liner.-- |
| 4 | 36 | "don" should read --down-- |
| 6 (Claim 5, | 54 line 2) | "aid in to" should read --aid in the-- |

Signed and Sealed this

Eighteenth Day of March, 2008

JON W. DUDAS
*Director of the United States Patent and Trademark Office*